(12) United States Patent
Sánchez Moral et al.

(10) Patent No.: US 8,361,518 B2
(45) Date of Patent: Jan. 29, 2013

(54) EDIBLE OLIVE POMACE OIL CONCENTRATED IN TRITERPENIC ACIDS, PROCEDURE OF PHYSICAL REFINING UTILISED FOR OBTAINMENT THEREOF AND RECOVERY OF FUNCTIONAL COMPONENTS PRESENT IN THE CRUDE OIL

(75) Inventors: Pedro Sánchez Moral, Benameji (ES); M$^a$ Carmen Dobarganes Garcia, Seville (ES); M$^a$ Victoria Ruiz Mendez, Seville (ES)

(73) Assignees: Oleicola el Tejar, S.C.A., Benameji (ES); Consejo Superior de Investigaciones Cientificas, Madrid (ES)

( * ) Notice: Subject to any disclaimer, the term of this patent is extended or adjusted under 35 U.S.C. 154(b) by 0 days.

(21) Appl. No.: 13/055,167

(22) PCT Filed: Jul. 21, 2009

(86) PCT No.: PCT/ES2009/070298
§ 371 (c)(1),
(2), (4) Date: Apr. 25, 2011

(87) PCT Pub. No.: WO2010/010219
PCT Pub. Date: Jan. 28, 2010

(65) Prior Publication Data
US 2011/0189320 A1 Aug. 4, 2011

(30) Foreign Application Priority Data
Jul. 22, 2008 (ES) .................................. 200802178

(51) Int. Cl.
*A61K 36/00* (2006.01)
*A61K 36/63* (2006.01)
*C11B 1/00* (2006.01)
*A23D 7/00* (2006.01)
*B01D 3/00* (2006.01)

(52) U.S. Cl. ............... 424/725; 554/8; 426/601; 203/71
(58) Field of Classification Search .................. None
See application file for complete search history.

(56) References Cited

U.S. PATENT DOCUMENTS

| 1,826,987 | A * | 10/1931 | Pierson et al. | 554/23 |
| 6,338,865 | B1 * | 1/2002 | van Putte | 426/417 |
| 6,482,442 | B1 * | 11/2002 | Dado | 424/539 |
| 2003/0171613 | A1 * | 9/2003 | Kuno et al. | 562/498 |
| 2004/0185157 | A1 * | 9/2004 | Kuno et al. | 426/425 |

FOREIGN PATENT DOCUMENTS
EP 0849517 2/1999
ES 2048667 3/1994

OTHER PUBLICATIONS

Severge et al., "Difficulties in Physical Refining of Olive Oil, due to Presence of Triterpene 'Oleanolic Acid'", JAOCS, 1983, vol. 60. pp. 584-587.
Bondioli et al., "Squalene Recovery from Olive Oil Deodorizer Distillates", JAOCS, 1993, vol. 70, pp. 763-766, the American Oil Chemists' Society.
Perez-Camino et al., "Quantitative Determination of Hydroxy Pentacyclic Triterpene Acids in Vegetable Oils", J. Agric. Food Chem., 1999, vol. 47, pp. 1558-1562, American Chemical Society.
Leon-Camacho et al. "Elimination of polycyclic aromatic hydrocarbons by bleaching of olive pomace oil", Eur. J. Lipid Sci. Technol., 2003, vol. 105, pp. 9-16, Wiley-VCH Verlag GmbH & Co. KGaA.
Liu, "Oleanolic acid and ursolic acid: Research perspectives", Journal of Ethnopharmacology, 2005, vol. 100, pp. 92-94, Elsevier Ireland Ltd.
Sato et al., "Anti-hyperglycemic activity of a TGR5 agonist isolated from *Olea europaea*", Biochemical and Biophysical Research Communications, 2007, vol. 362, pp. 793-798, Elsevier Inc.
Antonopoulos et al., "Olive oil and pomace olive oil processing", Grasas y Aceites, 2006, vol. 57, pp. 56-67.
Fernandez-Navarro et al., "Maslinic acid as a feed additive to stimulate growth and hepatic protein-turnover rates in rainbow trout (*Onchorhynchus mykiss*)", Comparative Biochemistry and Physiology, 2006, Part C vol. 144, pp. 130-140, Elsevier Inc.
Martin et al., "Supressive effect of maslinic acid from pomace olive oil on oxidative stress and cytokine production in stimulated murine macrophages", Free Radical Research, 2006, vol. 40, No. 3, pp. 295-302, Informa Healthcare.
Moral et al., "Production of pomace olive oil", Grasas y Aceites, 2006, vol. 57, pp. 47-55.
Braga et al., "Oleanolic acid inhibits the activity of the multidrug resistance protein ABCC1 (MRP1) but not of the ABCB1 (P-glycoprotein): Possible use in cancer chemotherapy", Cancer Letters, 2007, vol. 248, pp. 147-152, Elsevier Ireland Ltd.
Horiuchi et al., "Antimicrobial Activity of Oleanolic Acid from *Salvia officinalis* and Related Compounds on Vancomycin-Resistant *Enterococci* (VRE)", Biol. Pharm. Bull., 2007, vol. 30 No. 6, pgs. 1147-1149, Pharmaceutical Society of Japan. Martin et al., "Acidic Triterpenes Compromise Growth and Survival of Astrocytoma Cell Lines by Regulating Reactive Oxygen Species Accumulation", Cancer Research, 2007, vol. 67, pp. 3741-3751, American Association for Cancer Research.
Garcia et al., "Enrichment of pomace olive oil in triterpenic acids during storage of "Alpeorujo" olive paste", Eur. J. Lipid Sci. Technol., 2008, vol. 110, pp. 1136-1141, Wiley-VCH Verlag GmbH & Co. KGaA, Weinheim.
Lanzani et al., "A new model of molecular distillation plant of physical refining of olive husk oil"—Abstract, 1988.
International Search Report dated Nov. 11, 2009 for international application No. PCT/ES2009/070298.
Consejo Olecio the Internacional: "Guia of Gestion de the Calidad of the Industria dthe Aceite of Olivia: Las Refineries" T.33-1/Doc. No. 2-2 (2006), pp. 14-17.
Yague Aylon, M.A.: "Estudio of Utilizacion of Aceites para Fritura in Establecimientos Alimentarios of comidas Preparadas" (2003) Observatori of the Seguretat Alimentaria, Esco the de Prevencio i Seguretat Intergral, UAB, Bellaterra, p. 10.

* cited by examiner

*Primary Examiner* — Qiuwen Mi
(74) *Attorney, Agent, or Firm* — Gardner Groff Greenwald & Villanueva, PC

(57) ABSTRACT

The present invention relates to products obtained from crude olive pomace oil by centrifugation or decantation of the pomace, wherein said products contain a specific composition of triterpenic acids (especially maslinic and oleanolic acids), fatty acids, and ethyl esters; these products are suitable for use as additives in human or animal food products or in cosmetics products.

25 Claims, 1 Drawing Sheet

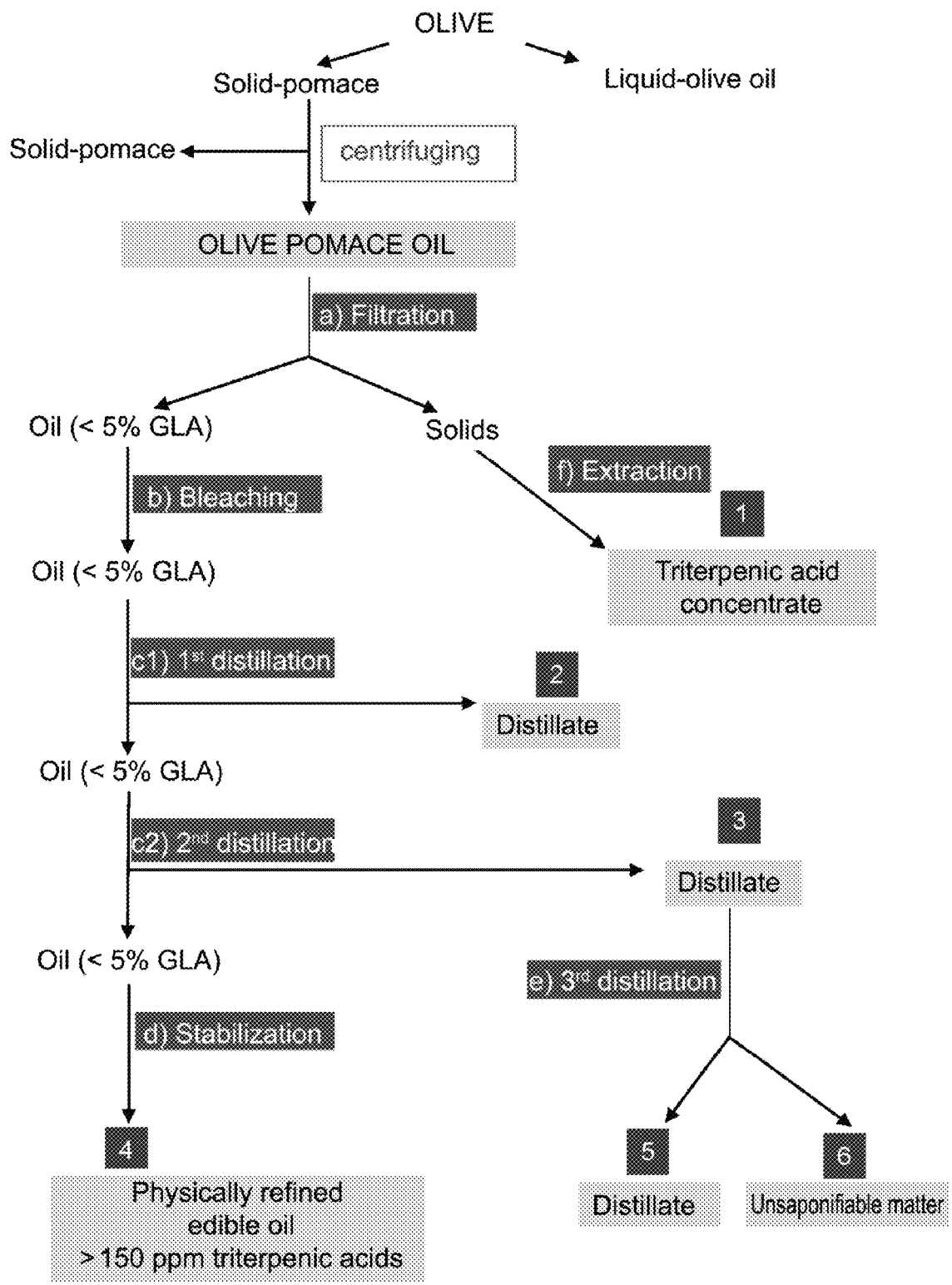

EDIBLE OLIVE POMACE OIL CONCENTRATED IN TRITERPENIC ACIDS, PROCEDURE OF PHYSICAL REFINING UTILISED FOR OBTAINMENT THEREOF AND RECOVERY OF FUNCTIONAL COMPONENTS PRESENT IN THE CRUDE OIL

IN THE CROSS-REFERENCE TO RELATED APPLICATIONS

This application claims priority to Spanish Application No. P200802178, filed Jul. 22, 2008, which is hereby incorporated by reference in its entirety for all purposes.

FIELD OF THE ART

The present invention is included within the field of food technology describing a new physical refining process based on the neutralization of the free fatty acids by successive high temperature and vacuum distillations. It specifically discloses the obtainment process, from an olive pomace oil of centrifuging or decantation, of an edible oil with a high concentration in triterpenic acids with direct application as a constituent in food. Furthermore, an object of the invention is also the recovery of a concentrate rich in triterpenic acids, as well as of other functional components present in the crude oil, based on the by-products of the process and which may be designed for sectors as varied as food, cosmetics and energy, as well as a source of compounds of interest for the chemical and pharmaceutical industry, such as medicinal and veterinary preparations.

STATE OF THE ART

Pomace is the solid residue obtained in olive oil mills, once the olives have undergone the primary olive oil extraction process by mechanical means. It is largely composed of the solid residues from the pulp, the skin and the stone or pit of the olives, by oil retained in said solid waste (and which has not been possible to extract by conventional mechanical processes) and by the water of constitution (from the actual olive) and added during the oil extraction process (Sánchez Moral and Ruiz Méndez, 2006). The traditional process of extracting this oil and producing "crude pomace oil" is carried out by using hexane, a light hydrocarbon from oil and immiscible with water. The process consists of two steps, an initial drying step of the pomace until approximately 8% humidity and a later step of extraction with the solvent.

However, pomace oils extracted using this traditional method have two clear drawbacks. In first place, the extracted oils have a greater quantity of phospholipids, waxes and a large quantity of anomalous compounds such as soaps and ethyl esters. Furthermore, when the two-phase system has been used in the obtainment process of the virgin olive oil, the subsequent drying of the pomace has to be performed at very high temperatures and, due to the such drastic conditions used, the crude pomace oil obtained also has unusually high quantities of Polycyclic Aromatic Hydrocarbons (hereinafter, PAHs) (400-200 ppb of benzo-alpha-pyrene) (León Camacho et al., 2003).

In order to avoid and/or reduce the presence of all these components in olive pomace oil, an alternative to the use of solvents, and which avoids the initial drying of the pomace, was presented in the patent of invention ES 2 048 667 (Artacho, Oleícicola El Tejar, 1994). This patent disclosed a completely mechanical process for the extraction of olive pomace oil without the use of organic solvents. By using this alternative process, between 40-60% of the retained oil can still be achieved in the two-phase pomace. The process consists of a second centrifugation, after the initial separation of the virgin olive oil, in a horizontal centrifuge or "decanter", of the starting pomace oil, fresh or stored, obtaining what is called "re-pressed oil". This oil, commercially classified as "crude pomace oil", stands out as it has a minimum quantity of PAHs, its formation does not take place as there is no drying step, and of phospholipids, as solvents are not used in its obtainment process.

Additionally, and as well as significantly reducing the presence of these compounds, the main characteristics of the olive pomace oil resulting from mechanical extraction is that it contains very high quantities of bioactive and functional compounds of great interest such as, for example, triterpenic acids.

Triterpenic acids are natural compounds present in plants and in food whereto beneficial health properties have been attributed and, therefore, they are subject to demand by the food, cosmetics and pharmacology industry. Among the beneficial properties attributed to triterpenic acids, they stand out because of their antimicrobial and anti-hyperglycemic activities (Horiuchi et al, 2007, Sato et al, 2007), their anti-inflammatory and anti-tumour activities (Márquez-Martín et al., 2006, Braga et al., 2007, Martín et al., 2007), they are growth stimulating factors if used in trout diets (Fernández-Navarro et al., 2006), and have a liver protection effect (Liu et al., 1995).

Triterpenic acids, constituents of olive skin, pass to the oil due to the hydrolytic processes that take place in the olive and in the pomace. Thus, appreciable quantities of these acids are not found in the extra virgin olive oils but they are found in the pomace oils and in the virgin olive oils with an acidity above 1% (Pérez Camino and Cert., 1999). Furthermore, it is well established that the concentration of triterpenic acids increases with the storage time of the pomace, and can reach concentrations above 15 g/kg after seven months, and with oleanolic and maslinic being the two main triterpenic acids identified. The maslinic acid content is greater than that of oleanolic acid in the pomace oil obtained through centrifuging (García et al., 2008).

The general idea that olive pomace oil is considered to be a magnificent source of this type of compounds is confirmed by the different obtainment processes of triterpenic acids, from the olive pomace itself, the solid residue from olive oil extraction (García Granados, 1998), and the by-products of oil processing (Kuno, 2003), which have recently been patented.

On the other hand, the oils must be refined for their use as edibles. Oil refining is a process that has the object of eliminating the undesirable compounds as they communicate characteristics of colour, smell and taste that are not pleasant for the consumer, or they affect product stability. These compounds may be natural in the oils (such as phospholipids or free acidity), the degradation compounds (peroxides) or the reagents added during the process (caustic soda, earth, etc.) (De Greyt and Kellens, 2000).

At present, the conventional process that is typically applied to olive pomace oil is the process called chemical refining which has the following steps: degumming neutralization, winterization, bleaching and deodorization (Antonopoulos et al., 2006). Briefly, the initial step of degumming has the objective of eliminating phospholipids by the addition of hydrating agents. Later, the degummed oil is treated with an alkaline solution to precipitate the free fatty acids such as soaps and, at the same time, eliminate the remaining traces of phospholipids. During the winterization step, and by cooling and later filtration or centrifuging, those compounds are eliminated which precipitate at ambient temperature, mainly the waxes and saturated triglycerides present in the neutral oil. In the bleaching step, pigments, oxidation products and traces of metals are eliminated. In deodorization, the last step of chemical refining, the minority compounds present in the oils responsible for the smell and taste are eliminated such as aldehydes, ketones, alcohols and hydrocarbons; finally, an oil with acceptable colour and taste for final consumption is obtained (De Greyt and Kellens, 2000). The main drawback of the classic alkaline refining of pomace oil is found in the neutralization step where the use of caustic soda eliminates, in addition to the free fatty acids, the triterpenic acids present in the oil in the form of soaps (Servege, 1983). Alternative neutralization methods currently under study are based on the elimination of fatty acids by the use of supercritical fluids (Bondioli, 1992) or by a molecular distillation step (Lanzani et al., 1988).

Therefore, and as an alternative to the classic alkaline refining for obtaining an olive pomace oil suitable for consumption and which also contains all the initially present triterpenic acids, the present invention uses a physical refining process wherein the free fatty acids are, in this case, eliminated in successive distillation steps in a vacuum and at a high temperature.

Furthermore, whilst conventional chemical refining may need up to six steps with continuous phase separations that are never performed with 100% efficiency, the physical refining process presented only requires three. Therefore, another advantage of the process presented is that, by eliminating the steps of degumming, neutralization with alkali, washes and winterization, neutral oil losses are reduced, a greater final yield of the process is obtained and, in parallel, pollution is reduced due to the soapy waters.

Another advantage of the physical refining process presented is that it makes it possible to recover very high quality by-products. On the one hand, the initial filtration of the oil enables separating the triterpenic acids insoluble in the oil and obtaining a concentrate with over 50% purity and, on the other hand, the by-products from the different distillations of the physical refining processes constitute, by themselves, a good raw material for the obtainment of compounds of high added value. As an example of these by-products, during the process object of the patent, in addition to the final olive pomace oil, concentrated in triterpenic acids, not only are the free fatty acids obtained but appreciable quantities of phytosterols, hydrocarbons and tocopherols, which have been object of an intense research activity for several decades, are also obtained.

Therefore, the present invention is based on a new physical refining process where, using olive pomace oil obtained by centrifugation or decantation as the raw starting material, the decrease in the free fatty acids is produced by controlled distillation steps, avoiding the use of chemical compounds such as phosphoric acid and sodium hydroxide during the process. This makes it possible to keep the triterpenic acids with lower volatility in the final oil, thus obtaining oil suitable for consumption enriched in the triterpenic acids present in the initial pomace and, additionally, various fractions and concentrates enriched in triterpenic acids, methyl and ethyl esters, sterols or squalene of great industrial and medical interest.

DESCRIPTION OF THE INVENTION

Brief Description

The present invention discloses a refining process that makes it possible to obtain, for the first time, a refined olive pomace oil, rich in triterpenic acids from the oil itself and suitable for consumption. For this purpose, a physical refining process is presented which, using the product obtained from filtering an olive pomace oil obtained by centrifugation or decantation as the starting product, is based on the elimination of the free fatty acids present by distillation, in controlled steps, of the oil filtered and bleached. Additionally, the refining process presented allows the use of all the high value by-products generated during the process.

Therefore, a first aspect of the present invention consists of the filtration process, step a) of FIG. 1, of an olive pomace oil obtained by centrifugation or decantation characterized in that the filtration of the starting crude olive pomace oil is carried out through filters with a pore size of between 20-0.1 microns, at temperatures over the ambient temperature and below 70° C., preferably between 35-45° C.

A second aspect of the invention consists of the refining process to eliminate the free fatty acids present in the filtered olive pomace oil obtained in the previous step which is carried out via successive controlled distillations, not producing the steps of degumming, alkaline neutralization, washes and winterization established in traditional chemical refining, with the purpose of maintaining the triterpenic acids, of less volatility, present in the final oil and which comprises the following steps (FIG. 1):

b.—bleaching, by the addition of the suitable quantity of technological coadjuvants, preferably activated bleaching earth (0.5%-2%), amorphous silica (trisyl) (0.1%-0.5%) and active carbon (0.05% and 0.2%), of the filtered oil obtained in the previous step (a). For the process, the starting filtered oil is degasified and heated to the normal bleaching temperature, between 80° C. and 120° C. Then the necessary technical coadjuvants are added stirring for a maximum of 30 minutes in pressure conditions below 70 mbar, preferably 40 mbar. Finally, a filtration process is performed to remove the technological coadjuvants added;

c.—distillation of the free fatty acids. In a first distillation (c1), the bleached product oil obtained in section (b) is subjected to a distillation at a temperature below 200° C. and vacuum below 10 mbar, in a fine layer distiller with or without nitrogen or vapour dragging, obtaining a distillate [2] as by-product. By a second distillation (c2) at a temperature below 250° C. and vacuum below 5 mbar, the residual free fatty acids in the product oil of the treatment (c1) are eliminated, additionally obtaining distillate [3], d.—deodorization and stabilization of the oil obtained in step (c) by vacuum distillation below 3 mbar and at a low temperature, below 220° C., with vapour dragging, obtaining an oil [4] with a triterpenic acid content above 150 ppm suitable for consumption;

e.—obtainment of a more volatile fraction [5] and an unsaponifiable matter concentrate [6] as distillation by-products of the product obtained in section (c), distillate [3], by a third distillation, molecular or in high-vacuum short path (between 0.1 mbar and 0.001 mbar) and at a temperature below 215° C.

A third aspect of the invention consists of a process of solid-liquid extraction, step f), with organic solvents, preferably hexane and ethanol, of the product retained in step a) of filtration.

A fourth aspect of the invention consists of a concentrated extract [1] characterized in that it is obtained by application of steps a) and f), and in that it has a triterpenic acid concentration above 20%, normally above 50%, and where the proportion of maslinic acid is greater than that of oleanolic acid. A fifth aspect of the invention consists of a distillate [2] characterized in that it is obtained by application of steps a), b) and c1), and in that it has a concentration of free fatty acids greater than 60% and of total ethyl esters greater than 10%.

A sixth aspect of the invention consists of a distillate [3] characterized in that it is obtained by application of steps a), b), c1) and c2), and in that it has a concentration of free fatty acids greater than 30% and of total ethyl esters greater than 5%.

A seventh aspect of the invention consists of a refined olive pomace oil [4] characterized in that it is obtained by application of steps a), b), c1), c2) and d), and in that it has a triterpenic acid concentration, preferably maslinic and oleanolic, above 150 ppm.

A seventh aspect of the invention consists of a distillate [5] characterized in that it is obtained by application of steps a), b), c1), c2) and e), and in that it contains, at least, fatty acid esters with short-chain linear alcohols, squalene and free fatty acids.

An eighth aspect of the invention consists of a concentrate [6] characterized in that it is obtained by application of steps a), b), c1), c2) and e), and in that it has a content of unsaponifiable matter above 15%, largely consisting of sterols.

DETAILED DESCRIPTION

The present invention tackles the problem of offering a refined pomace oil suitable for consumption, which preserves the maximum of triterpenic acids present initially in the olive pomace oil obtained by centrifugation. This olive pomace oil rich in triterpenic acids is obtained by a physical refining process which avoids the use of chemical compounds such as phosphoric acid and sodium hydroxide during the process.

The process presented in this patent starts with an initial filtration step (a) of the olive pomace oil obtained mechanically. The oil filtration is carried out sequentially through filters of 20 microns, 10 microns, 5 microns, 1 micron and 0.1 microns, since the pomace oil obtained by centrifugation contains a large quantity of solids in suspension and, if the mesh is initially small, the filters collapse, preventing the flow of oil, for which reason the filters are placed in series with the pore size decreasing in each one. The retained solids largely consist of triterpenic acids insoluble in the oil due to their high concentration and low solubility.

The filtration is carried out at temperatures over the ambient temperature and below 70° C., to decrease the viscosity of the oil and increase its fluidity without solubilising the triterpenic acids to separate. The solid residue in a by-product rich in triterpenic acids and the filtrate is a transparent pomace oil which is later subjected to the refining process which starts with a bleaching step.

Later, and during the bleaching step (b), those compounds are eliminated which are responsible for the colour of the oil such as pigments, chlorophylls and carotenes, principally, and degradation compounds which have chromophore groups as hydrocarbonated chains with conjugated double bonds. The bleaching is carried out by adding activated bleaching earth (aluminium-magnesium silicates) on whose active centres the compounds of interest are adsorbed. Polar substances such as soaps and phospholipids collapse the active centres of the earth and do not allow them to work effectively against chlorophylls and other chromophore compounds, for which reason it is of crucial interest that the elimination is carried out effectively using amorphous silica such as Trisyl (Grace) to achieve the objective of this step and the subsequent distillation steps. During this step, the use of active carbon is also recommended to eliminate oxidized compounds responsible for the dun colour present in pomace oil, and pollutants such as polycyclic aromatic hydrocarbons.

The treatment is performed in a vacuum below 70 mbar, the habitual process being as follows: the oil is degasified and heated until working temperature, between 80° C. and 120° C. Then the necessary technological coadjuvants are added and it is stirred for a maximum of 30 minutes. Later, the oil is filtered to remove the added coadjuvants.

The bleached oil obtained is subjected to a distillation (c) whose objective is to eliminate the free fatty acids from the oil, until their content is below 0.5%. The distillation uses the differences in volatility and boiling points of the liquid components to separate and depends on variables such as temperature, pressure, composition of the mixture and liquid-vapour balance. If the operating pressure decreases, the volatility of the compounds increases and it causes boiling at low temperatures which avoids thermolabile compounds from being degraded.

For the development of the process described in this patent, thin layer distillers are preferably used, very suitable for the elimination of free fatty acids, which are, in this case, the principal volatile compounds eliminated through the upper part of the column.

In practice, the distillations are carried out in several steps, varying the temperature as the composition of the boiling liquid composition varies. In this case, two distillation steps have been applied. The first distillation (c1) enables the obtainment of a low acidity oil (<3% expressed as oleic acid) and of a distillate [2] which contains as the main compounds free fatty acids, fatty acid esters with short-chain alcohols such as ethyl and methyl and a low content of unsaponifiable matter, being applicable in the field of oliochemistry and bioenergy. The distillation is carried out at a temperature below 200° C. and vacuum below 10 mbar, in a fine layer distiller, obtaining an oil with acidity that is still above 0.5% (expressed as a percentage of oleic acid).

The second distillation (c2) of the oil has the object of completing the separation of the free fatty acids. The product obtained in section (c1) is subjected to a distillation at a temperature below 250° C. and vacuum below 5 mbar in a fine layer distiller, with or without nitrogen or vapour dragging. This distillation gives an oil with low acidity (<0.5%, expressed as oleic acid) and a distillate [3] concentrated in free fatty acids, fatty acid esters with short-chain alcohols, and unsaponifiable matter, particularly squalene and sterols.

Finally, the process is completed with the classic deodorization step of the refining process (d). It is a vacuum distillation process and at a high temperature, which is carried out by water vapour dragging although, as an alternative, the use of nitrogen is also stated (Huesa and Dobarganes, 1990). The temperatures used for deodorization are between 180° C. and 270° C. These temperature limits are established by the chemical reactions of decomposition and hydrolysis which are produced during this step (Sjöberg, 1991).

The minimum time required normally depends on the degree of heat bleaching that one wants to obtain. The quantity of volatiles generated in this step is below 0.1% of the quantity of oil subjected to treatment.

An oil [4] is obtained with a triterpenic acid content above 150 ppm suitable for consumption, object of this patent.

Use of the By-Products

1—Use of the Filtration by-Products: Obtainment of the Triterpenic Acid Concentrate To separate the concentrate [1] from the solid filtering means, a solid-liquid extraction is performed, step f) of FIG. 1. The process can be performed both continuously and discontinuously, or progressively enriching the miscella in combined systems [e.g. discontinuous solid extractors and continuous solvent enriching system].

When the filtering means used are manufactured in cellulose, they require non-polar organic solvents that do not solubilise the triterpenic acids, preferably hexane, to remove the oil occluded in the filters, fundamentally triglycerides and waxes, and then a polar solvent, preferably ethanol at 60° C.-80° C. to solubilise and separate the triterpenic acids.

If the filters used are metal or porcelain, this extraction step of triterpenic acids with ethanol is sufficient as there is no oil retained.

Then, the clarification is performed, by filtration or centrifugation, of the extracts and the clarificate is concentrated by vacuum evaporation of the solvent, until achieving a gross volume of the extract between 20% and 50% of the initial macerating volume. Finally, the extract can also be vacuum dried to obtain it in powder form.

A greater proportion of maslinic acid is always obtained as it is more insoluble in oil.

2—Use of the Distillation by-Products: Obtainment of the Bioactive Concentrate

From the distillate [3] obtained in step (c2) and by a third distillation, the most volatile fraction [5] and an unsaponifiable matter concentrate [6] are obtained. This process uses a high-vacuum short path distillation (0.1-0.001 mbar), or a molecular distillation, with working temperatures lower than 215° C., obtaining fractions that are enriched in certain bioactive compounds. The operating conditions are adjusted according to the quality of the distillate [3] obtained.

a) the most volatile fraction, called distillate [5], is characterized in that it has a content of fatty acid esters with short-chain linear alcohols, squalene and free fatty acids, in variable proportions.

b) the least volatile fraction, called concentrate [6], has an unsaponifiable matter content above 15%, largely constituted by squalene and sterols, and it has a great industrial potential, with immediate application in human and animal food, as well as in pharmacology and cosmetics, whether in its integral form, or concentrated or diluted in its totality or fractions, or eliminating fractions, which will be the object of the claims in the patent formulation.

Both fractions can later undergo treatments for the insulation of the different compounds.

BRIEF DESCRIPTION OF THE DRAWINGS

FIG. 1 is a diagram depicting each step of the process by which the products derived from olive pomace oil are obtained.

EXAMPLES OF EMBODIMENT OF THE INVENTION

The main characteristics of the process can be materialized in several forms, without this reducing the scope of the invention.

Step 1.—Obtainment of Olive Pomace Oil with High Triterpenic Acid Content Suitable for Consumption.

1.1 Filtration. In first place, the filtration of the crude olive pomace oil obtained by centrifugation is carried out. The filtration was carried out at 40° C., sequentially using cellulose filters with decreasing pore diameter: 20 microns, 10 microns, 5 microns, 1 micron and 0.1 microns. Table 1 summarises the characteristics of the initial oil and the filtered oil.

TABLE 1

Characteristics of the initial oil and after being filtered

|  | INITIAL OIL | FILTERED OIL |  | INITIAL OIL | FILTERED OIL |
| --- | --- | --- | --- | --- | --- |
| ACIDITY (% oleic ac.) | 10.50 | 10.15 | Triterpenic acids | | |
| Stability (h) | 35 | 32 | Maslinic (ppm) | 6352 | 1363 |
| UNSAPONIFIABLE (%) | 2.40 | 2.18 | Oleanolic (ppm) | 4255 | 3395 |
| Waxes (ppm) | 3500 | 3298 | Erythrodiol + Uvaol (ppm) | 388 | 350 |
| Aliphatic alcohols (ppm) | 3704 | 3500 | Tocopherols (ppm) | 350 | 345 |
| Total Sterols (ppm) | 4136 | 3040 | | | |
| Composition Percentage | | | | | |
| Cholesterol (%) | 0.1 | 0.1 | b-Sitosterol (%) | 94.7 | 94.9 |
| Campesterol (%) | 3.0 | 3.0 | D7-Stigmasterol (%) | 0.5 | 0.5 |
| Stigmasterol (%) | 1.2 | 1.2 | D7-Avenasterol (%) | 0.2 | 0.2 |
| Fatty acids | | | | | |
| Palmitic ac. (%) | 8.16 | 8.16 | Linolenic ac. (%) | 0.75 | 0.82 |
| Palmitoleic ac. (%) | 0.46 | 0.50 | Arachic ac. (%) | 0.48 | 0.45 |
| Stearic ac. (%) | 3.52 | 3.33 | Gadoleic ac. (%) | 0.36 | 0.35 |
| Oleic ac. (%) | 74.65 | 74.16 | Behenic ac. (%) | 0.16 | 0.15 |
| Linoleic ac. (%) | 10.37 | 10.65 | Lignoceric ac. (%) | 0.07 | 0.09 |

1.2 Bleaching. To the filtered oil obtained, 2% by weight of bleaching earth was added, containing 0.2% of active carbon (Tonsil 4121 FF, SüdChemie, Germany), and 0.1% of TRISYL (GRACE, USA), and the temperature was increased to 110° C., maintaining in these conditions for 20 minutes at a vacuum of 40 mbar. Next, the oil was filtered in a laboratory press filter with Teflon plates (10×10 cm) and paper filter.

1.3 First distillation. The bleached oil was subjected to a first distillation of fatty acid esters with short-chain alcohols and free fatty acids, at a temperature below 190° C. and vacuum of 4.5 mbar in a fine layer distiller without nitrogen or vapour dragging. An oil was obtained with acidity of 2.6% of oleic acid and a distillate [2].

1.4 Second distillation. A second distillation was carried out of the product oil from the previous treatment to separate the remaining free fatty acids, at a temperature of 230° C. and vacuum of 0.5 mbar in a fine layer distiller without nitrogen or vapour dragging (Table 2). A low acidity oil was obtained, 0.5% of oleic acid, and a distillate [3] concentrated in free fatty acids, fatty acid esters with short-chain alcohols, and unsaponifiable matter, particularly squalene and sterols.

TABLE 2

Main characteristics of the oil before and after undergoing successive distillations Main physicochemical characteristics of the oils

| Operating cond. | Acidity (% oleic ac.) | Unsaponifiable (%) | Rancimat (h) | Tocopherol (ppm) |
|---|---|---|---|---|
| Bleached 1st DISTILLATION | 10.15 | 2.45 | 20.0 | 339 |
| 190° C., 4.5 mbar 2nd DISTILLATION | 2.60 | 1.58 | 19.3 | 153 |
| 230° C., 0.5 mbar | 0.45 | 1.50 | 23.5 | 156 |

1.5 Deodorization and stabilization. The oil obtained in the previous treatment was deodorized and stabilized by vacuum distillation of 2 mbar and at a temperature of 215° C., with vapour dragging. An oil [4] was obtained with a triterpenic acid concentration of 900 ppm and suitable for consumption, whose characteristics are shown in the following Table 3.

TABLE 3

Characteristics of the olive pomace oil with high triterpenic acid concentration suitable for consumption Final deodorized oil [4]

| ACIDITY (% oleic ac.) | 0.43 | Triterpenic acids (ppm) | 903 |
|---|---|---|---|
| Stability (h) Rancimat 110° C. | 25 | Maslinic (ppm) | 310 |
| Peroxide index (meg O2/kg) | 0.2 | Oleanolic (ppm) | 593 |
| UNSAPONIFIABLE (%) | 1.40 | Tocopherols (ppm) | 150 |
| Waxes (ppm) | 3710 | Erythrodiol + Uvaol (ppm) | 354 |
| Aliphatic alcohols (ppm) | 2940 | | |
| Total Sterols (ppm) | 1959 | | |
| Cholesterol (%) | 0.3 | b-Sitosterol (%) | 94.5 |
| Campesterol (%) | 3.0 | D7-Stigmasterol (%) | 0.5 |
| Stigmasterol (%) | 1.0 | D7-Avenasterol (%) | 0.7 |
| Fatty acids | | | |
| Palmitic ac. (%) | 8.16 | Linolenic ac. (%) | 0.75 |
| Palmitoleic ac. (%) | 0.46 | Arachic ac. (%) | 0.48 |
| Stearic ac. (%) | 3.52 | Gadoleic ac. (%) | 0.36 |
| Oleic ac. (%) | 74.65 | Behenic ac. (%) | 0.16 |
| Linoleic ac. (%) | 10.37 | Lignoceric ac. (%) | 0.07 |

Step 2.—Use of the by-Products 2.1. Obtainment Process of the Triterpenic Acid Concentrate.

The obtainment process of the triterpenic acid concentrate was performed using, for the solid-liquid extraction, a soxhlet reactor with 2 kg capacity solid container and 20 l of liquid flask capacity.

In first place, the cellulose filters of 10 microns, 5 microns, 1 micron and 0.1 microns were introduced in the solids container and was subjected to an extraction with hexane of the non-polar compounds, during 4 hours. The extract obtained dragged insoluble compounds in hexane for which reason the clarification was performed, by filtration or centrifuging of the extract, and a solid was achieved which is joined with the concentrate obtained in the following step.

Then, the compounds retained in the filters were extracted with ethanol during 8 hours and the extract obtained was subjected to vacuum drying until obtaining a concentrate in powder form.

A concentrate [1] was obtained with 60% of terpenic acids, 40% corresponding to maslinic acid and 20% to oleanolic acid.

2.2. Obtainment Process of the Bioactive Concentrate.

The distillates obtained are characterized in that they have a high content of non-glyceride esters of fatty acids with short-chain alcohols such as ethyl and methyl above 10% and a content of free fatty acids close to 50%.

The Distillate [2] fraction is mainly composed of free fatty acids (73.33%), and fatty acid esters with short-chain alcohols (16.85%), and a small proportion of unsaponifiable matter (0.88%).

The most volatile fraction, distillate [5], was obtained from distillate [3], as well as a less volatile fraction, concentrated in unsaponifiable matter [6]. This process used a high-vacuum short path distillation (0.01 mbar) at 210° C., obtaining two fractions enriched in certain active principles (Table 4). The unsaponifiable fraction present in the most volatile fraction fundamentally consists of squalene whilst the least volatile fraction is enriched in sterols.

TABLE 4

Composition of distillate (3) and the fractions obtained therefrom

| | INITIAL [DISTILLATE 3] | Volatile fraction Distillate [5] | Non-volatile fraction Bioactive concentrate [6] |
|---|---|---|---|
| Total non-glyceride esters | 11.1% | 17.8% | 0.7% |
| Acidity (oleic acid) | 47.5% | 69.3% | 15.4% |
| Unsaponifiable matter | 13.8% | 6.6% | 20.0% |

REFERENCES

Antonopoulos, K., Valet, N., Spiratos, D., Siragakis, G. (2006) Procesado de aceite de oliva y aceite de orujo. Grasas y Aceites 57, 56-67.

Artacho, A (1994) Procedimiento para la extracción de aceite de orujo de oliva sin utilización de disolventes orgánicos. Patent No. ES2048667.

Bondioli, P.; Mariani, C.; Lanzani, A.; Fedeli, E.; Mossa, A.; Muller, A. (1992) Lampante olive oil refining with supercritical carbon dioxide. J. Am. Oil Chem. Soc. 69, 477-480.

Braga, F.; Ayres-Saraiva, D.; Gatas, C. R.; Capella, M. A. M. (2007) Oleanolic acid inhibits the activity of the multidrug resistance protein ABCC1 (MRP1) but not of the ABCB1 (p-glycoprotein): Possible use in cancer therapy. Cancer Letters 248, 147-152.

De Greyt, W.; Kellens, M. (2000) Refining Practice. In Edible oil Processing. W. Hamm and R. J. Hamilton (Editors).—Sheffield Academic Press, Sheffield, England pp. 90-105.

Fernández-Navarro, M.; Peragón, J.; Esteban, F. J.; Higuera, M.; Lupiáhĕz, A. (2006) Maslinic acid as a feed additive to stimulate growth and hepatic protein-turnover rates in rainbow trout (Onchorhynchus mykiss). Comparative Biochem. Physiol. Part C. 144, 130-140.

García, A.; Brenes, M.; Dobarganes, C.; Romero, C.; Ruiz-Méndez, M. V.

(2008) "Enrichment of pomace olive oil in triterpenic acids during storage of "Alpeorujo" olive paste" Eur. J. Lipid Sci. Tech. Accepted for its publication.

García-Granados, A.; Martínez, A.; Parra, A.; Rivas, F. (1998) PCT Int. Appl. WO 043331/1998 (Chem. Abstr. 1998, 128, 179706).

Horiuchi, K.; Shiota, S.; Hatano, T.; Yoshida, T.; Kuroda, T.; Tsuchiya, T. (2007) Antimicrobial activity of oleanolic acid from Salvia officinalis and related compounds on vancomycin-resistant enterococci (VRE). Biol. Pharm. Bull. 30, 1147-1149.

Huesa, J.; Dobarganes, M. C. (1990) Patent ES 2.013.206. Chem. Abstr., 113, 1744-1764.

Kuno, N.; Shinohara, G. (2003) Method for the preparation of oleanolic acid and/or maslinic acid. U.S. Pat. No. 171,613 A1

Lanzani, A.; Bondioli P.; Allevi C.; Baretteau P.; Bertini C. G. (1988) Un impianto di distillazione con caratteristiche innovative nella tecnologia di raffinazione di olio di sansa Riv. Ital. Sostanze Grasse 65, 439-443

León-Camacho, M.; Viera-Alcaide, I.; Ruiz-Méndez, M. V. (2003) Elimination of polycyclic aromatic hydrocarbons by bleaching of olive pomace oil. Eur. J. Lipid Sci. Tech. 105, 9-16

Liu, J.; Liu, Y.; Parkinson, A.; Klaassen C. D. (1995) Effect of oleanolic acid on hepatic toxicant-activating and detoxifying systems in mice. J. Pharmacol. Exp. Ther. 257, 768

Márquez-Martín, A.; Puerta, R.; Fernández-Arche, A.; Ruiz-Gutiérrez, V.; Yaqoob P. (2006). Modulation of cytokine secretion by pentacyclic triterpenes from olive pomace oil in human mononuclear cells. Cytokine 36, 211-217.

Martín, R.; Carvalho, J.; Ibeas, E.; Hernández, M.; Ruiz-Gutiérrez, V.; Nieto, M. L. (2007) Acidic triterpenes compromise growth and survival of astrocytoma cell lines by regulating reactive oxygen species accumulation. Cancer Res. 67, 3741-3751.

Pérez-Camino, M. C.; Cert, A. (1999) Quantitative determination of hydroxyl pentacyclic triterpene acids in vegetable oil. J. Agric. Food Chem. 47, 1558-1562.

Sánchez-Moral, P.; Ruiz-Méndez M. V. (2006) Obtención de aceite de orujo. Grasas y Aceites 57, 47-55.

Sato, H.; Genet, C.; Strehle, A.; Thomas, C.; Lobstein, A.; Wagner, A.; Mioskowski, C.; Auwerx, J.; Saladin, R. (2007) Anti-hyperglycemic activity of a TGR5 agonist isolated from Olea europaea. Biochem. Biophys. Res. Commun. 2007, 362, 793-798.

Servege, A. (1983) Difficulties in Physical Refining of Olive oil due to presence of Triterpene "oleanolic acid. J Am Oil Chem Soc. 60, 584-587.

Sjöberg, P. (1991) Deodorization technology. Lipid Technol., 3, 52-57.

The invention claimed is:

1. A concentrate [1] obtained by centrifugation or decantation of crude olive pomace oil characterized in that it comprises a step a) of filtration of the starting crude olive pomace oil carried out through filters having a pore size comprised in the interval of 0.1 to 20 microns and a temperature below 70° C., characterized in that the concentrate has a concentration of triterpenic acids above 20%.

2. A concentrate according to claim 1, characterized in that the concentrate has a greater proportion of maslinic acid than oleanolic acid.

3. A distillate [2] obtained by centrifugation or decantation of crude olive pomace oil characterized in that it comprises a step a) of filtration of the starting crude olive pomace oil carried out through filters having a pore size comprised in the interval of 0.1 to 20 microns and a temperature below 70° C., characterized in that the distillate has a concentration of free fatty acids greater than 60% and of total ethyl esters greater than 10%.

4. A distillate [3] obtained by centrifugation or decantation of crude olive pomace oil characterized in that it comprises a step a) of filtration of the starting crude olive pomace oil carried out through filters having a pore size comprised in the interval of 0.1 to 20 microns and a temperature below 70° C., characterized in that the distillate has a concentration of free fatty acids greater than 30% and of total ethyl esters greater than 5%.

5. A refined olive pomace oil [4] obtained by centrifugation or decantation of crude olive pomace oil characterized in that it comprises a step a) of filtration of the starting crude olive pomace oil carried out through filters having a pore size comprised in the interval of 0.1 to 20 microns and a temperature below 70° C., characterized in that the refined olive pomace oil has a concentration of triterpenic acids above 150 ppm.

6. A distillate [5] obtained by centrifugation or decantation of crude olive pomace oil characterized in that it comprises a step a) of filtration of the starting crude olive pomace oil carried out through filters having a pore size comprised in the interval of 0.1 to 20 microns and a temperature below 70° C., characterized in that the distillate contains, at least, fatty acid esters with short-chain linear alcohols, squalene and free fatty acids.

7. A concentrate [6] obtained by centrifugation or decantation of crude olive pomace oil characterized in that it comprises a step a) of filtration of the starting crude olive pomace oil carried out through filters having a pore size comprised in the interval of 0.1 to 20 microns and a temperature below 70° C., characterized in that the concentrate has an unsaponifiable matter content above 15%.

8. Food comprising the concentrate [1] according to claim 1.

9. Human food, animal food, or a cosmetic comprising the distillate [3] according to claim 4, wherein the distillate is in its integral form, or concentrated or diluted in its totality or fractions.

10. Human food comprising the refined olive pomace oil [4] according to claim 5, wherein the oil is in its integral form or diluted or concentrated in other functional components.

11. Human food, animal food, or a cosmetic comprising the distillate [5] according to claim 6, wherein the distillate is in its integral form, or concentrated or diluted in its totality or fractions.

12. Human food, animal food, or a cosmetic comprising the concentrate [6] according to claim 7 wherein the distillate is in its integral form, or concentrated or diluted in its totality or fractions, or eliminating fractions.

13. The food according to claim 8, wherein the food comprises a food supplement.

14. A refining process of crude olive pomace oil obtained by centrifugation or decantation of the pomace characterized in that it comprises a step a) of filtration of the starting crude olive pomace oil carried out through filters having a pore size comprised in the interval of 0.1 to 20 microns and a temperature below 70° C. wherein the resultant concentrate contains a concentration of triterpenic acids above 20%.

15. The process according to claim 11, characterized in that it further comprises a step b) of bleaching of the oil filtered in the previous step at a temperature comprised in the interval between 80° C. and 120° C., at a pressure below 70 mbar, and the following steps:
  b1) addition of technological coadjuvants,
  b2) stirring of the mixture of the oil with the technological coadjuvants for a maximum of 30 minutes and,
  b3) filtration to remove the coadjuvants added.

16. The process according to claim 11, characterized in that it further comprises a step c) of distillation of the bleached oil obtained in the previous step.

17. The process according to claim 16, characterized in that step c) comprises one or more distillations.

18. The process according to claim 17, characterized in that step c) comprises two distillations.

19. The process according to claim 16, characterized in that the first distillation is carried out at a temperature below 200° C. and pressure below 10 mbar.

20. The process according to claim 19, characterized in that the second distillation is carried out at a temperature below 250° C. and pressure below 5 mbar.

21. The process according to claim 14, characterized in that it further comprises a step of distillation at a temperature below 220° C. and pressure below 3 mbar and with vapour dragging.

22. The process according to claim 14, characterized in that it further comprises a step of molecular or short path distillation at a temperature below 215° C. and at a pressure between 0.1 and 0.001 mbar.

23. The process according to claim 14, characterized in that it further comprises a step of solid-liquid extraction with organic solvents hexane and ethanol.

24. The process according to claim 14, wherein the step a) of filtration of the starting crude olive pomace oil carried out at a temperature between 35-45° C.

25. The process according to claim 24, wherein the step a) of filtration of the starting crude olive pomace oil carried out at a pressure of 40 mbar.

* * * * *